No. 751,011. PATENTED FEB. 2, 1904.
C. R. RAPSON.
HAME TUG AND TRACE CONNECTOR.
APPLICATION FILED APR. 27, 1903.
NO MODEL.
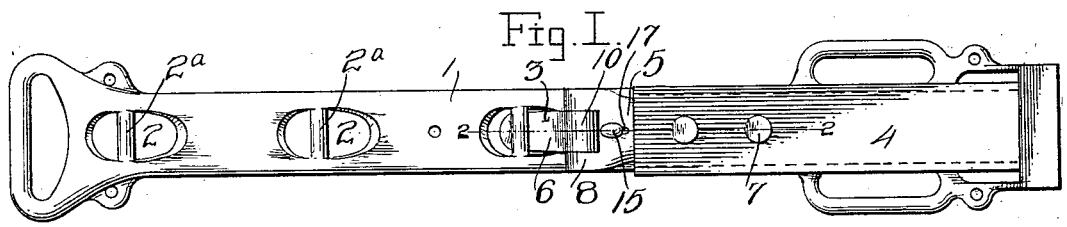
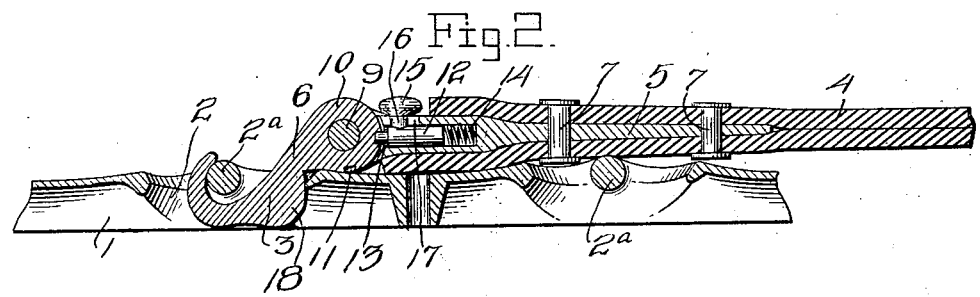
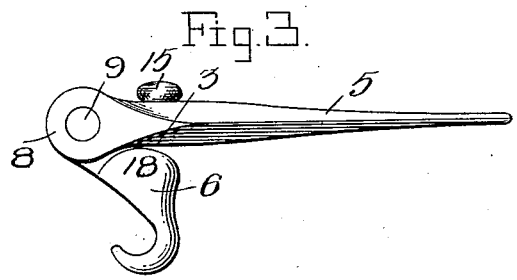
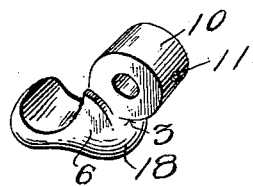
Witnesses
E. H. Reichenbach
O. H. Wilson
Inventor
Charles R. Rapson.
By H. B. Wilson.
Attorney No. 751,011. Patented February 2, 1904.

UNITED STATES PATENT OFFICE.

CHARLES RICHARD RAPSON, OF BADAXE, MICHIGAN.

HAME-TUG AND TRACE CONNECTOR.

SPECIFICATION forming part of Letters Patent No. 751,011, dated February 2, 1904.

Application filed April 27, 1903. Serial No. 154,479. (No model.)

*To all whom it may concern:*

Be it known that I, CHARLES RICHARD RAPSON, a citizen of the United States, residing at Badaxe, in the county of Huron and State of Michigan, have invented certain new and useful Improvements in Hame-Tug and Trace Connectors; and I do declare the following to be a full, clear, and exact description of the invention, such as will enable others skilled in the art to which it appertains to make and use the same.

My invention relates to new and useful improvements in a hook for connecting the hame-tug and trace.

The object of the invention is to provide such a connection by means of which the trace may be easily and quickly adjusted upon the hame-tug plate without the necessity of bending the trace, which is both injurious to the same and difficult to bend.

A further object is to provide such a device which is simple in construction, durable in use, and comparatively inexpensive of production.

With these and other objects in view the invention consists of certain novel features of construction, combination, and arrangement of parts, as will be more fully described, and particularly pointed out in the appended claim.

In the drawings, Figure 1 is a side elevation of a hame-tug plate, one end of a trace, and my improved hook connecting said plate and trace. Fig. 2 is a horizontal sectional view taken on the line 2 2 of Fig. 1, showing the parts on a larger scale. Fig. 3 is an edge view of the hook and stem, showing the hook swung at substantially right angles to the stem to permit the same to be engaged with or removed from the plate. Fig. 4 is a perspective view of my improved hook removed from the stem.

Referring to the drawings in detail, the numeral 1 denotes the plate of the hame-tug, which plate may be of any well-known or preferred construction and is formed with a longitudinal series of openings or apertures 2, provided with the cross-bars $2^a$, which are adapted to be engaged by the hook 3 upon the end of the trace 4, as shown in Figs. 1 and 2.

My improved hook or connector 3 comprises the attaching stem or tongue 5 and the pivoted hook 6. Said stem 5 is tapered at one end and is riveted, as shown at 7, between the thicknesses of the trace 4. The opposite end of the stem is formed with the apertured ears or arms 8, between which the hook 6 is pivoted by the pin 9. Said pin passes through the apertures in the ears 8 and through the hub or cylindrical portion 10 of the hook. It will thus be seen that by this construction the hook can be swung at a right angle to the trace to permit of it being engaged with the plate without bending the trace. In order to lock the hook rigidly to the trace after it is engaged or while it is being engaged with the plate, I provide the recesses or holes 11 in the cylindrical portion 10 of the hook, which recesses are adapted to be engaged by the end of a sliding spring-actuated bolt 12 in the stem 5 of the hook. This bolt 12 is slidably mounted in a socket or recess 13, formed in the stem between the ears 8, and is forced outwardly by the coil-spring 14. Said bolt is provided with a finger-piece 15, by means of which the same is moved inwardly to disengage the bolt from the hook 6. The finger-piece 15 is connected by a short neck 16 to the bolt, which neck moves in a slot 17 in the stem.

When it is desired to attach or adjust the trace upon the hame-tug plate, the bolt 12 is withdrawn to free the hook 6, which is then swung to the position shown in Fig. 3 and engaged with the cross-bars $2^a$ of one of the apertures 2 of the plate without bending the trace, as is necessary when a rigid hook is used. After engagement the parts will assume the position shown in Figs. 1 and 2. The teat or end of the bolt 12 will engage the recess 11 in the hook 6 to lock said hook rigidly to the trace, and thereby prevent casual disengagement when the trace is forced forwardly upon the plate.

The hook 6 is provided upon its rear side or back with an enlargement 18, which, as shown in Fig. 2, is adapted to contact with or engage the rear of the aperture 2 in the plate, and thereby strengthen both the hook and the plate.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim, and desire to secure by Letters Patent, is—

In combination with a hame-tug plate having an opening and a cross-bar extending across the opening at a point between the ends thereof, a trace-connector comprising a stem for attachment to a trace, said stem having at its outer ends a pair of ears projecting therefrom and disconnected from each other to form a free open space between them, a longitudinal socket communicating with the space between the ears and a slot on the outer side of the stem, communicating with the socket, and a spring-pressed bolt in the socket having an operating-stud working in the slot, and a hook having an eye pivoted between the ears and provided in its rear face with a plurality of spaced openings for engagement by the bolt, the said hook having a stop 18, to engage one end of the opening in the tug-plate, when the hook is in engagement with the cross-bar thereof, said hook, stop, coengaging end of the opening and the cross-bar, coacting with the bolt, when the latter is in engagement with one of the openings in the stud, and the plate and trace are under draft stress, to lock the hook against angular movement with reference to the tug-plate, substantially as described.

In testimony whereof I have hereunto set my hand in presence of two subscribing witnesses.

CHARLES RICHARD RAPSON.

Witnesses:
S. H. BLAKELY,
F. A. WATKINS.